US011000768B2

(12) United States Patent
Orak

(10) Patent No.: US 11,000,768 B2
(45) Date of Patent: May 11, 2021

(54) USER INTERFACE FOR A VIDEO GAME

(71) Applicant: Zeki Orak, San Francisco, CA (US)

(72) Inventor: Zeki Orak, San Francisco, CA (US)

(*) Notice: Subject to any disclaimer, the term of this patent is extended or adjusted under 35 U.S.C. 154(b) by 25 days.

(21) Appl. No.: 16/289,541

(22) Filed: Feb. 28, 2019

(65) Prior Publication Data

US 2019/0308102 A1  Oct. 10, 2019

Related U.S. Application Data

(60) Provisional application No. 62/653,251, filed on Apr. 5, 2018.

(51) Int. Cl.
| | | |
|---|---|---|
| *A63F 13/57* | (2014.01) | |
| *A63F 13/822* | (2014.01) | |
| *A63F 13/537* | (2014.01) | |
| *A63F 13/42* | (2014.01) | |

(52) U.S. Cl.
CPC .............. *A63F 13/57* (2014.09); *A63F 13/42* (2014.09); *A63F 13/537* (2014.09); *A63F 13/822* (2014.09)

(58) Field of Classification Search
CPC ...... G07F 17/3213; A63F 13/57; A63F 13/42; A63F 13/822
See application file for complete search history.

(56) References Cited

U.S. PATENT DOCUMENTS

| | | | | | |
|---|---|---|---|---|---|
| 5,769,716 | A * | 6/1998 | Saffari | ............... | G07F 17/3265 |
| | | | | | 273/143 R |
| 6,093,104 | A * | 7/2000 | Kasahara | ............. | A63F 13/005 |
| | | | | | 463/30 |
| 7,144,322 | B2 * | 12/2006 | Gomez | .................... | G07F 17/32 |
| | | | | | 463/20 |
| 7,690,985 | B1 * | 4/2010 | Muskin | ................... | G07F 17/34 |
| | | | | | 463/20 |
| 8,366,538 | B1 * | 2/2013 | Saunders | .............. | G07F 17/326 |
| | | | | | 463/11 |
| 2004/0023714 | A1 * | 2/2004 | Asdale | .................... | G07F 17/32 |
| | | | | | 463/22 |
| 2009/0118004 | A1 * | 5/2009 | Hoffman | ............. | G07F 17/3248 |
| | | | | | 463/31 |

(Continued)

OTHER PUBLICATIONS

Youtube.com, "Bejeweled 2 Action—Levels 1~22 [720p]", 2013, Youtube.com, at https://www.youtube.com/watch?v=VH2o_A5f7oo (last visited Jun. 3, 2020) (Year: 2013).*

*Primary Examiner* — Steve Rowland
(74) *Attorney, Agent, or Firm* — Trellis IP Law Group, PC

(57) ABSTRACT

Implementations include objects displayed on a computing device's display screen arranged in a pattern such as a grid. Upon selection of object(s) having at least one common property (e.g., color) with other adjacent object(s), the adjacent object(s) having one or more common properties may be removed causing spaces to be opened up into which other of the displayed objects, and objects off of the screen display, are moved into in order to fill up the spaces. When the movement of the other objects creates one or more collisions of objects having the common property(s) then those colliding and adjacent objects may be, in turn, removed from the display. The process of removing objects, filling the space with new objects, and checking for a condition (e.g., a common property) may be repeated in a "chain reaction" without user intervention until the condition ends.

18 Claims, 16 Drawing Sheets

(56) References Cited

U.S. PATENT DOCUMENTS

| | | | |
|---|---|---|---|
| 2009/0137309 A1* | 5/2009 | Thomas | G07F 17/3211 463/20 |
| 2010/0004050 A1* | 1/2010 | Caputo | G07F 17/3265 463/21 |
| 2011/0045906 A1* | 2/2011 | Berman | G07F 17/3202 463/32 |
| 2011/0053675 A1* | 3/2011 | Aoki | G07F 17/3213 463/20 |
| 2011/0086695 A1* | 4/2011 | Evans | G07F 17/34 463/20 |
| 2014/0235338 A1* | 8/2014 | Hansson | A63F 13/2145 463/31 |

* cited by examiner

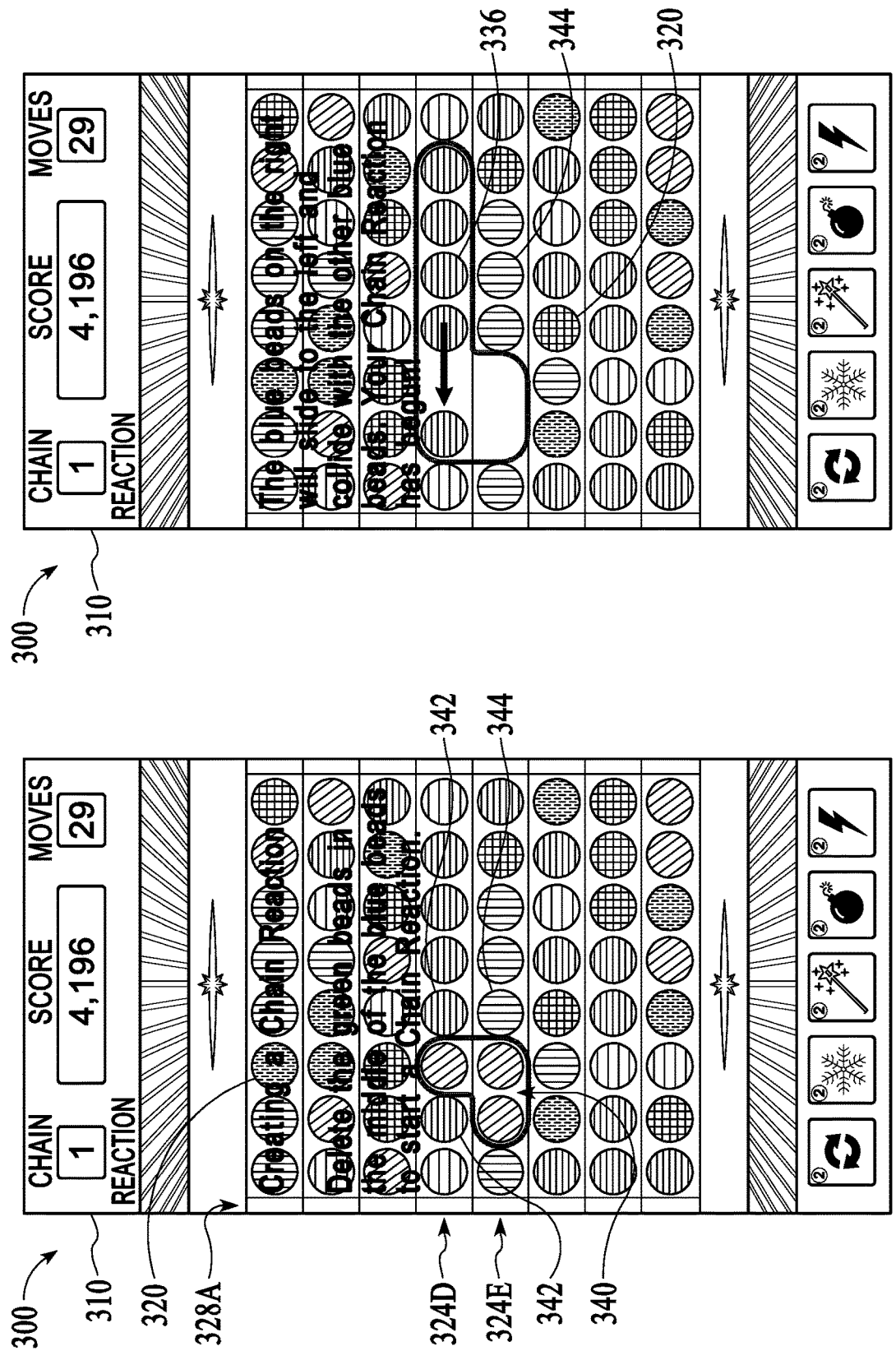

BEAD BASH Game and Collision Mechanic

392 → Badges: Collectables are 20+, 30+. 40+. 50+ and 60+ Clusters, 3x3, 4x4, 5x5, 6x6, 7x7 and 8x8 Squares, 1-36 Captures, 2-9 Multi Box Captures, Level Jumpers and Edge to Edge Badges.

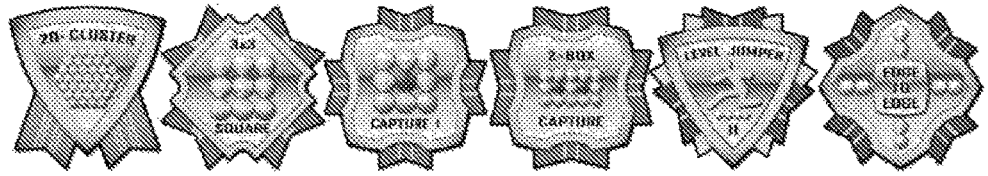

394 → Trophies: Collectables are Local Daily #1 and Local Daily Top 10, State Daily #1 and State Daily Top 100, National Daily #1 and National Daily Top 100, Global Daily #1 and Global Daily Top 100, Friends Daily #1 and Friends All Time #1, and Global All Time Champ and Global All Time Top 100 Trophies.

396 → Achievements: Collectables are Diamond (Requires 10 Trillion Point), 7, 30, 60, 90, 120, 365 Days Local Winning Streaks and 10-20 Chain Reaction along with grand prize Jackpot Achievements.

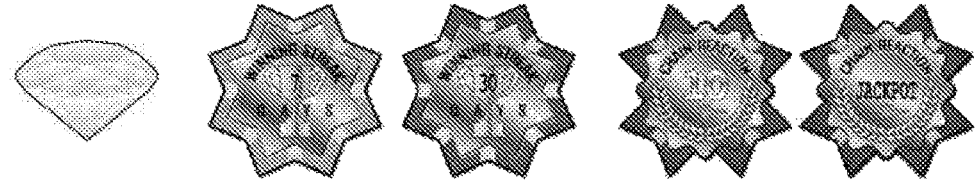

FIG. 15

USER INTERFACE FOR A VIDEO GAME

CROSS REFERENCES TO RELATED APPLICATIONS

This application claims the benefit of U.S. Provisional Patent Application Ser. No. 62/653,251, entitled USER INTERFACE FOR A VIDEO GAME, filed on Apr. 5, 2018, which is hereby incorporated by reference as if set forth in full in this application for all purposes.

SUMMARY

Video games have seen rapid growth in popularity and are a large source of entertainment for many people. As mobile computing devices also became popular, it has become desirable to create user interfaces for mobile games that can make efficient use of the smaller screen sizes and limited control inputs. Preferably, a user interface will implement game mechanics that are easily learned, performed and enjoyed by a user.

Some currently popular video games are considered object-matching games where the gameplay requires the user manipulate the position of static game objects within an initial game layout in order to create patterns, such as a pattern of jewels, in order to score points. Typically, when a user moves a game piece to create a required pattern, the game objects forming the required pattern are eliminated leaving gaps associated with the required pattern. The removed game objects cause a reconfiguration of the static game pattern as the gaps are filled in by other game objects either located within the current game layout or newly generated. As the game layout is reconfigured, any new required patterns that are created by the reconfiguration automatically eliminate game objects associated with those new required pattern formations. The reconfiguration of the game layout continues during the turn, sometimes creating a cascading effect, until all required patterns are created. When all the required patterns have been formed through the reconfiguration process, the game the remains in a static state as a new turn awaiting user input to move game objects to create the required pattern. Unfortunately, having users move game objects to form these static required game patterns offer little if any motivation and/or excitement beyond simple pattern creation and the possibility of creating a cascade effect to achieve a higher score.

Therefore, what is needed is a system and method that allows a user to play a object matching game that overcomes static pattern generation and that provides for enhanced gameplay excitement and challenges.

SUMMARY

In a particular embodiment, objects are displayed on a computing device's display screen. The objects may be arranged in a pattern, such as a grid of columns and rows. When a user selects an object that has at least one common property (e.g., color) with other adjacent objects, then at least some of the adjacent objects having that common property are removed. Removing the objects may cause spaces to be opened up into which other of the displayed objects, and objects off of the screen display, are moved into in order to fill up the spaces. If the movement of the other objects creates one or more collisions of objects having a common property then those colliding and adjacent objects are, in turn, may be removed from the display. The process of removing objects, filling the space (e.g., voids, gaps, and the like) with new objects, and checking for a condition (e.g., a common property) can be repeated in a "collision chain reaction" until the condition is no longer met. When the condition is no longer met the chain reaction ends and the user can be presented with another turn for selecting and removing another object or objects. Many other game mechanics or characteristics can be employed such as keeping score, logging a high score, providing power-ups, awarding extra points for special patterns or moves, etc.

In another embodiment, collision between two or more objects may be simulated using a collision algorithm configured to simulate interaction between colliding objects leading to the colliding objects being removed via a visual and/or audio effect such as explosion, fragmentation, burning, vaporizing, and the like, in response to the collision. In one embodiment, collisions may be simulated where the objects are removed upon contact (e.g., explode upon contact), or appear to bounce off of one another before being removed as though they were solid objects. In other scenarios, collisions between objects may cause initiate a removal effect where the objects change in some attribute such as color or size to emulate an initiation of a removal special effect, e.g., an object begins to bulge before exploding.

In one embodiment, the initial game object layout varies as a function of time. In this configuration, the player is presented a non-static game configuration that varies over a set period of time or variable period of time, in response for example to a clock time, or may vary in response to other criteria such as a random or pseudo random trigger, and/or to external stimulus such as music, barometric pressure, changes in temperature, and the like.

In some embodiments, some object removal and subsequent collisions between objects may be tied to a specific number of moves to remove a particular number and/or type of object in order to win the game. In this scenario, the user may be incentivized to develop a removal strategy in order to remove objects to meet the winning criteria.

Embodiments include gameplay scenarios that produce special objects, e.g., a sparkling bead, that has special use to, for example, allow a user to remove from the display a specific pattern of objects, remove specific objects, reveal a hidden image, etc.

A further understanding of the nature and the advantages of particular embodiments disclosed herein may be realized by reference of the remaining portions of the specification and the attached drawings.

BRIEF DESCRIPTION OF THE DRAWINGS

FIGS. 7A-7B are screenshots to illustrate object movement in an embodiment;

FIG. 15 is a screenshot to illustrate game trophies and achievement awards in an embodiment.

DETAILED DESCRIPTION OF EMBODIMENTS

Embodiments include a method and system used to display objects, e.g. game objects, on a computing device's display screen. The objects may be arranged in a pattern such as a grid of columns and rows. In one configuration, after a user selects an object that has at least one common property such as color, size, shape, animation, etc., with other adjacent objects then the adjacent objects having that at least one common property are visually removed from the display. Removing the objects may cause one or more voids such as spaces or gaps to be opened up into which other of the displayed objects, and objects off of the screen display, are moved into in order to fill up the one or more voids. The movement of the other objects into the one or more voids may generate one or more collisions between objects. The movement of the other objects may also include moving objects that are adjacent to the colliding objects. When two or more objects collide, then those colliding and adjacent objects which have the at least one common property are, in turn, removed from the display. The process of removing objects, filling the space with new objects, and checking for a condition (e.g., a common property) can be repeated in a "collision chain reaction" until the condition is no longer met. When the condition is no longer met the chain reaction ends and the user can be presented with another turn for selecting and removing another object.

Figure 1:
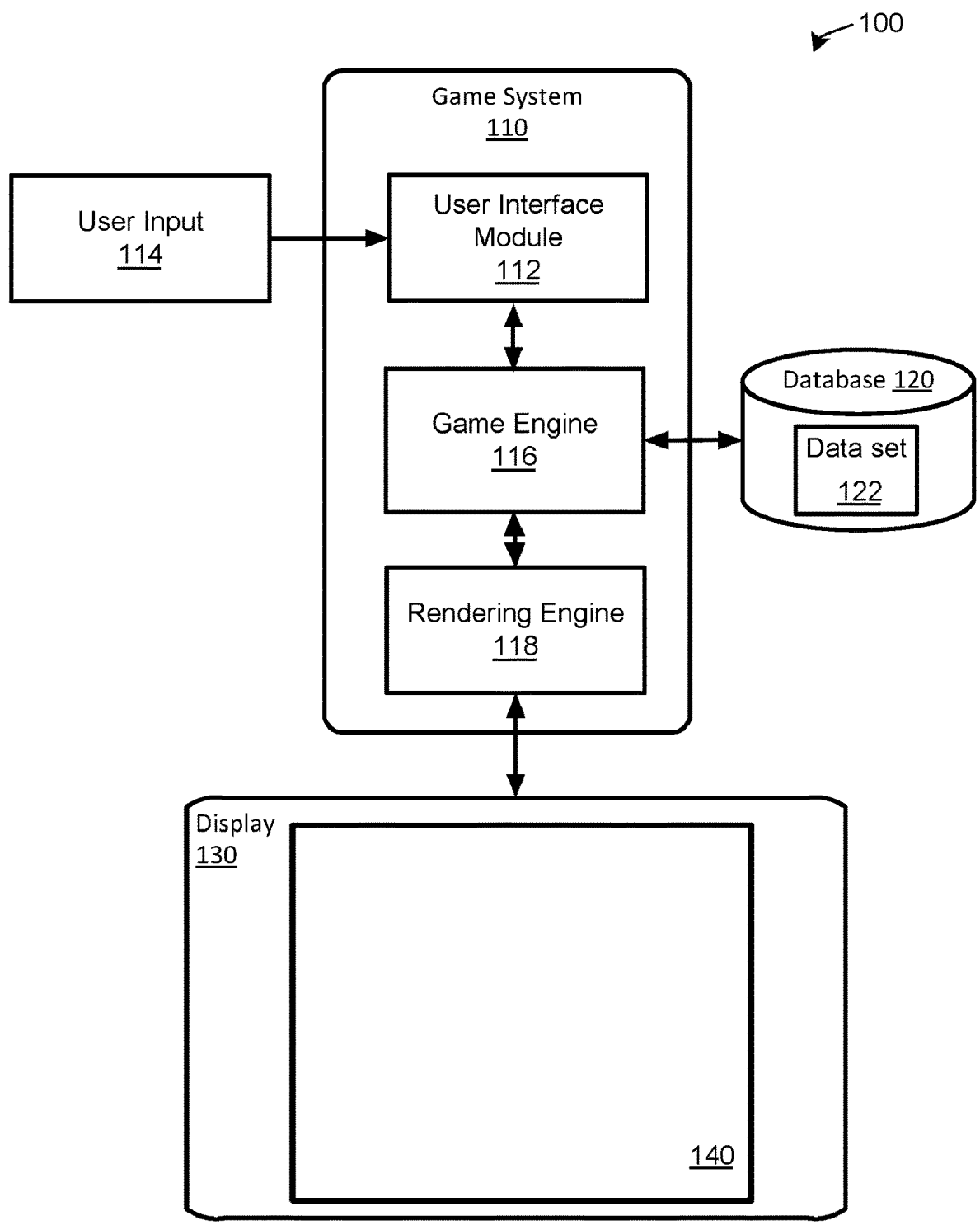
FIG. 1 is a high level illustration of a system for playing an electronic video game and variations thereof in an embodiment.

FIG. 1 is a high-level block diagram of an exemplary computing system 100 for providing for electronic games, video games, and variations thereof. Computing system 100 may be any computing system, such as a network computing environment, client-server system, and the like. Computing system 100 includes game system 110 configured to process data received from a user interface 114, such as a keyboard, mouse, etc., with regard to game mechanics or characteristics that may be employed in a computer game such as generating game objects, generating collision simulation, keeping score, logging scores, providing power-ups, awarding extra points for special patterns or moves, etc. as described herein.

Note that the computing system 100 presents a particular example implementation, where computer code for implementing embodiments may be implemented, at least in part, on a server. However, embodiments are not limited thereto. For example, a client-side software application may implement game system 110, or portions thereof, in accordance with the present teachings without requiring communications between the client-side software application and a server.

In one exemplary implementation, game system 110 may be connected to display 130 (e.g., game display) configured to display data 140 (e.g. game objects), for example, to a user thereof. Display 130 may be a passive or an active display, adapted to allow a user to view and interact with data 140 displayed thereon, via user interface 114. In other configurations, display 130 may be a touch screen display responsive to touches, gestures, swipes, and the like for use in interacting with and manipulating data 140 by a user thereof. Gestures may include single gestures, multi-touch gestures, and other combinations of gestures and user inputs adapted to allow a user to introspect, process, convert, model, generate, deploy, maintain, and update data 140.

In other implementations, computing system 100 may include a data source such as database 120. Database 120 may be connected to game system 110 directly or indirectly, for example via a network connection, and may be implemented as a non-transitory data structure stored on a local memory device, such as a hard drive, non-transitory Solid State Drive (SSD), flash memory, and the like, or may be stored as a part of a Cloud network as further described herein.

Database 120 may contain data sets 122. Data sets 122 may include data as described herein. Data sets 122 may also include data pertaining to game action flow, game objects (e.g., objects), special effect simulation (e.g., explosions), sounds, scoring, values, tracking data, data attributes, data hierarchy, nodal positions, values, summations, algorithms, code (e.g., C++, Javascript, JSON, etc.), security protocols, hashes, and the like.

In addition, data sets 122 may also contain other data, data elements, and information such game models, special effect simulators, physic models, fluid flow simulators, Integration Archives (IAR) files, Uniform Resource Locators (URLs), eXtensible Markup Language (XML), schemas, definitions, files, resources, dependencies, metadata, labels, development-time information, run-time information, configuration information, API, interface component information, library information, pointers, and the like.

Game system 110 may include user interface module 112, game engine 116, and rendering engine 118. User interface module 112 may be configured to receive and process data signals and information received from user interface 114. For example, user interface module 112 may be adapted to receive and process data from user input associated with data sets 122 for processing via game system 110.

In an exemplary implementation, game engine 116 may be adapted to receive data from user interface 114 and/or database 120 for processing thereof. In one configuration, game engine 116 is a software engine configured to receive and process input data from a user thereof pertaining to data 140 from user interface module 114, database 120, external databases, the Internet, ICS, and the like in order to play electronic games.

Game engine 116 may receive existing data sets 122 from database 120 for processing thereof. Such data sets 122 may include and represent a composite of separate data sets 122 and data elements pertaining to, for example, object interactions, object patterns, and the like. In addition, data sets 122 may include other types of data, data elements, and information such as object data, scoring data, explosion data, fluid dynamics data, collision simulation data, scientific data, financial data, and the like.

Game engine 116 in other implementations may be configured as a data analysis and processing tool to perform functions associated with data processing and analysis, on received data, such as data sets 122. Such analysis and processing functions may include collision emulation (e.g., emulating collisions between objects), fluid flow, reflection—including introspection, meta-data, properties and/or functions of an object during gameplay, recursion, traversing nodes of data hierarchies, determining the attributes associated with the data, determining the type of data, determining the values of the data, determining the relationships to other data, interpreting metadata associated with the data, checking for exceptions, and the like.

For example, game engine 116 may be configured to receive and analyze gameplay flows to determine whether such game flows contain errors and/or anomalies, and to determine whether such errors and/or anomalies are within an acceptable error threshold. Moreover, game engine 116 may be configured to determine whether to bypass, report, or repair such errors and anomalies as needed in order to continue gameplay.

Rendering engine 118 may be configured to receive configuration data pertaining to data 140, associated data sets 122, and other data associated with data sets 122 such as user interface components, icons, user pointing device signals, and the like, used to render data 140 on display 130. In one exemplary implementation, rendering engine 118 may be configured to render 2D and 3D graphical models and simulations to allow a user to obtain more information about data sets 122. In one implementation, upon receiving instruction from a user, for example, through user interface 114, rendering engine 118 may be configured to generate a real-time display of interactive changes being made to data 140 by a user thereof.

Figure 2:
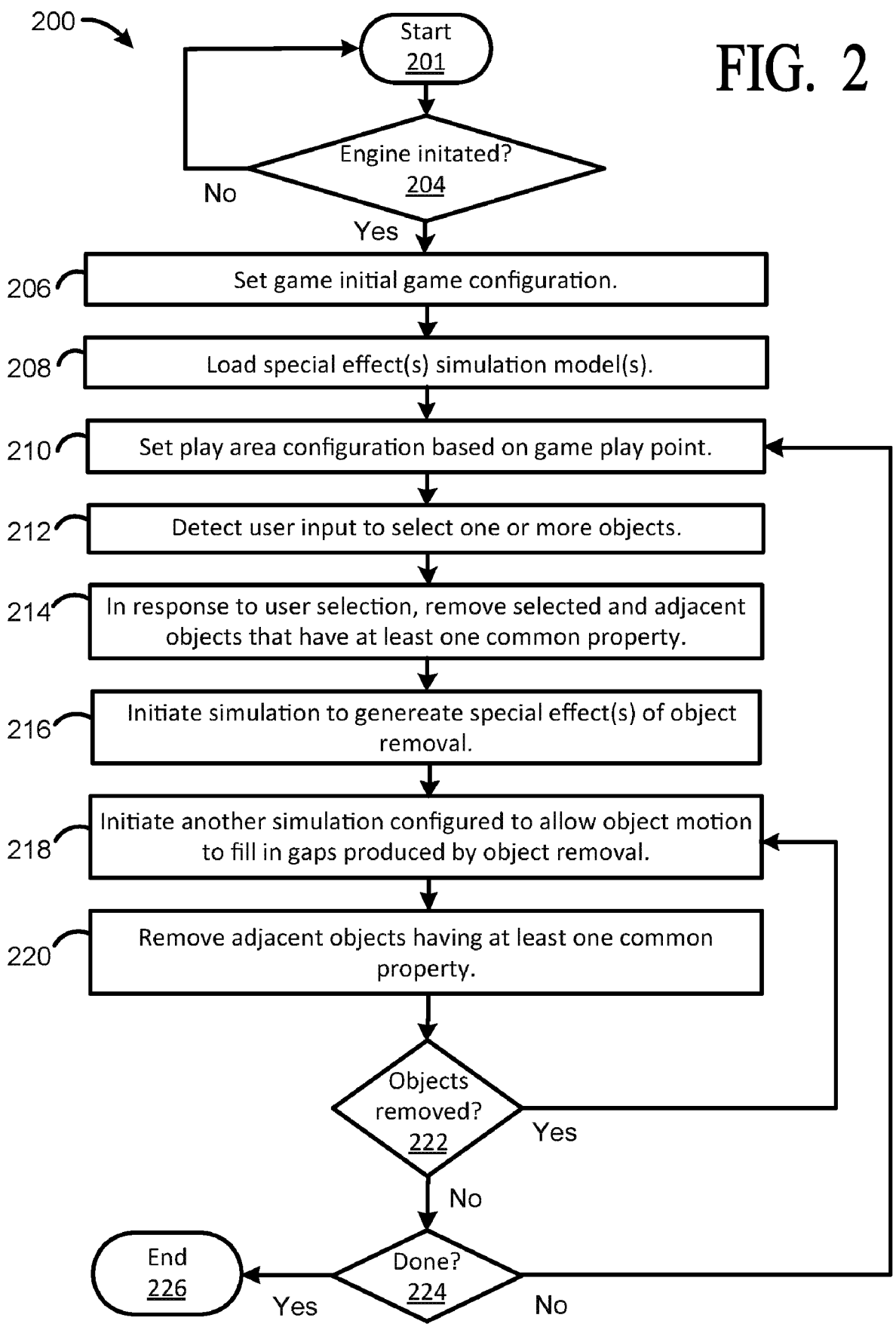
FIG. 2 is a flow diagram of an example method adapted for use with implementations, and variations thereof, illustrated in FIGS. 1 and 3-15.

FIG. 2 is a flow diagram of an example method 200 adapted for use with implementations, and variations thereof, for example, as illustrated in FIGS. 1 and 3-15. As illustrated, method 200 performs steps used to initiate and execute gameplay.

At 201, method 200 receives one or more gameplay instances. At 204, method determines if a game engine, such as game engine 116 is initiated. For example, as discussed supra, game engine 116 receives a trigger to initiate gameplay, which then may be provided to a first game environment, such as a mobile device, TV, etc., for presenting the game to a user.

At 206, method 200 sets the initial game configuration. For example, method 200 may set the gameplay area to an initial configuration of objects setting, gameplay time, gameplay sound, game colors, play area reconfigurations, reconfiguration interval, cascading actions, object types, simulation effects, one or multiplayer modes, hidden object modes, contests, and the like.

At 208, method 200 determines which simulation models to use for this instance. For example, method 200 may determine and load simulation algorithms such as simulated explosions, simulated fluid models, simulated physics models used to simulate contact between objects, and the like, used to enhance and implement instances of gameplay.

At 210, method 200 determines the configuration of the play area based on the point in the game instance. For example, if the game is being started, then method 200 may set the initial gameplay area configuration and display a plurality of objects in a particular or random starting configuration. However, at each gameplay interval, method 200 may set a new play area configuration, which may be appear to be sequential, random, or pseudo-random, etc.

For example, in one implementation, each subsequent reconfiguration after a gameplay interval may be based on emulating sequential motion of beads along a direction, such as a horizontal or vertical direction, and adding new objects that appear to come from entry points, and removing objects as they appear to exit via exit points of the gameplay area. As such, in this gameplay scenario, at each turn interval of the game each subsequent gameplay area configuration is different from the previous gameplay area configuration.

At 212, method 200 detects user selection of one or more objects presented within the gameplay area. For example, as described herein, a user selection of a bead or beads may be detected by method 200 for removal thereof from the play area.

At 214, in response to user selection of one or more objects, method 200 removes the objects from the play area. In addition, method 200 may determine adjacent objects having at least one common property (e.g., color, shape, attribute, animation, etc.) to the one or more objects being selected and remove those objects from the play area. In other implementations, method 200 may determine if there is a condition met by the orientation of the moved objects with respect to stationary objects within the play area, if so, then method 200 may also remove one or more of the moved or stationary objects according to the condition.

At 216, in response to a removal signal, method 200 may initiate a special effect such as an explosion, presented to the user to show the removal of the selected objects and any adjacent objects having the at least one common property. In implementations, special effects may be generated from algorithms, such as special effect algorithms, physical model simulations, fluid dynamic simulations, collision simulations, and the like.

At 218, in response to object removal, method 200 may initiate one or more special effects to emulate moving objects from within the play area and from entry points of the play area into a space formerly occupied by the removed objects. For example, filling in simulations may include using sliding motion emulation to emulate objects sliding into the gap areas, use fluid dynamics to emulate objects flowing into the gaps, or use other types of emulations, such as running or hopping to show objects filling in gaps.

At 220, upon the removal of objects at 218, method 200 may continue to remove objects that are adjacent and have the at least one common property. For example, such object removal may be part of a cascading removal process as discussed herein where the removal of objects may leave gaps that are automatically filled in by other objects which then may be subsequently removed as some objects filing in the gaps become adjacent to other objects that have the at least one common property with the objects filling in the gaps.

At 222, method 200 determines whether a specified amount or all adjacent objects having at least one common property have been removed. If there are more objects to remove, then method 200 returns to 218. If all, or the specified amount, of objects have been removed, then method 200 proceeds to 224.

At 224, if the gameplay is finished, method 200 proceeds to 226 and ends. However, if the gameplay is not done, method 200 proceeds to 210.

Figure 3:
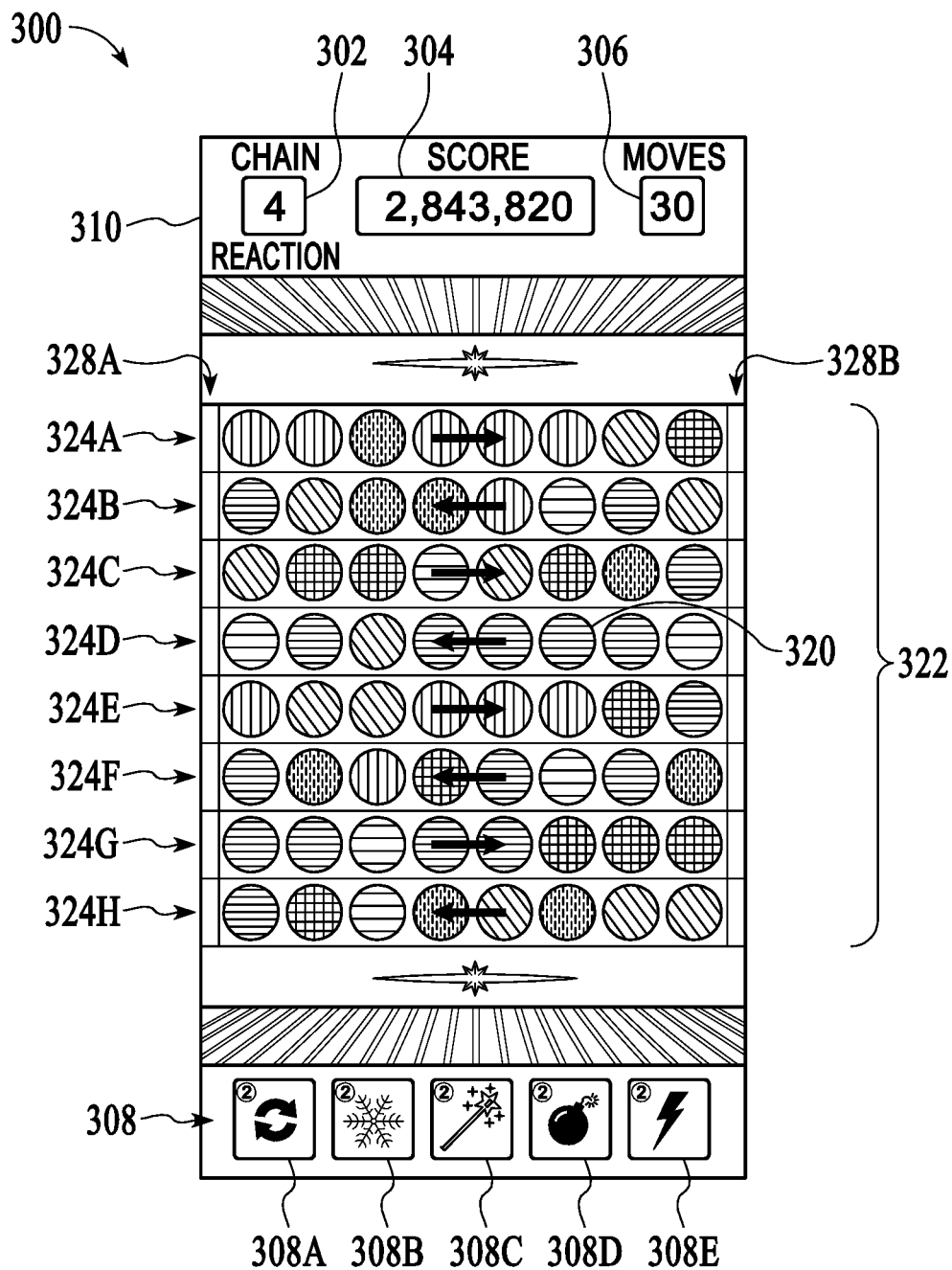
FIG. 3 is a screenshot to illustrate object movement directions in an embodiment.

FIG. 3 illustrates a screen shot of a particular implementation. Although specific details are provided for this example video game on an example display it should be apparent that many variations are possible. In general, many different types of games can be created using features of the user interface described herein. Also, a game may be presented or played on many different types of hardware such as TVs, Smart TVs, mobile phones, tablets, laptops, desktop computers, virtual reality headsets, augmented reality displays, etc. As discussed herein, denoted white lines and grey lines showing motion or groupings are not part of the gameplay or game display and are merely for ease of discussion.

In FIG. 3, screen display 300 includes play area 310, chain reaction counter/timer 302, score 304, moves 306, and power ups 308, including, game refresh 308A, freeze 308B, magic wand 308C, bomb 308D, and lightening 308E, as described herein. Counter 302 counts, for example, a time interval, number of game intervals played, etc. Score 304 may show various scores related to gameplay. Moves 306, shows the number of moves a player or players have made during a game. 308 when selected provides the user with options to, for example, acquire a new set of beads, freeze the game, delete certain objects, buy additional time, reduce or increase the number of game objects being displayed, etc.

For example, in one implementation power ups 308 may include refresh 308A which may allow a user to receive a new or partial set of objects, freeze 308B which may allow a user to freeze play for a non-specified or specified duration which may be configured to freeze timer 302 until player select objects to tap on and/or selects another power up to use, magic wand 308C where a player may delete one or more objects having at least one common property, such as color, off play area 310, where for example a player can tap on one of the red bead and all the red beads are deleted, bomb 308D which may be used to remove one or more objects in groups off the play area 310, and lighting 308E, which may be used to delete a number of objects situated in a particular group, such as a column of objects, row or objects, etc.

Main play area 310 shows many objects 320 which, in this embodiment, are moveable colored bead shaped objects 320 (e.g., beads, balls, marbles, etc.) arranged in an array or grid 322. Each row 324A-H of the grid 322 allows movement of the balls 320 in an alternating direction as shown by white arrows. The white arrows are not part of the gameplay or display but are shown for ease of discussion.

Thus, in this scenario, each row 324A-H, alternates direction as shown. For example, in rows 324A, 324C, 324E, and 324G the beads 320 move from left to right while in rows 324B, 324D, 324F, and 324H the beads 320 move from right to left. Note that in other variations objects 320 need not be arranged in a grid 322 but may have different organizations, or even no organization at all (i.e., random placement). Rather than moving from side-to-side the beads 320 or other objects 320 can move in other directions such as vertically. Directions need not alternate and can be set in any desired pattern. Directions may change during gameplay, etc. Many variations are possible.

In this example game mechanic, beads 320 may be shifted after a period of time or game interval, e.g., every 3 seconds, in the direction of their respective row 324A, 324B, etc., into a new location by one or more beads 320. The shifting may be periodic e.g., a time limit, encouraging users to make moves more quickly. Also, it can be used strategically by a user to allow the board to change to a more favorable configuration. For example, as beads 320 shift positions, a user may see a pattern emerging over one or more shifts. Other game variations need not use a timer or can implement automatic shifting or movement of the game objects by other rules, as desired.

When a row 324 is shifted it typically means a bead 320 disappears and another bead 320 appears from the respective exit and entry edges 328A-B of a particular row 324. In this example, a new bead 320 entering a row 324 may be hidden from the user (e.g., inside an entry edge 328) and may be randomly, pseudo-randomly, or semi-randomly generated. In some gameplay scenarios there may be a higher or lower probability that the beads 320 being generated will be of a matching attribute (e.g., color) to adjacent beads. In other variations, other rules can be used to determine the color or other properties of objects 320 entering the play area 310.

In one embodiment, respective entry edges 328A and/or exit edges 328B may be configured to reveal or provide clues as to which one or more objects 320 are coming out of entry edges 320A or what just left the exit edges 328B. In some cases, entry/exit edges 328 may change in appearance to reflect which objects are emerging. For example, one or more attributes, such as color, dimension, surface pattern, and the like of entry edge 328A may change to signal, which one or more objects 320 are coming out of the entry edge 328A into the play area 310. The amount and types of hints may vary according to, for example, a players level, number of cascading events, time lapse, score, etc. For example, entry edges 328A or exit edges 328B may change color, shape, or surface attribute to reflect a next object 320 coming from an entry edge 320A or a leaving object 320 leaving via an exit edge 320B.

Figure 4B:
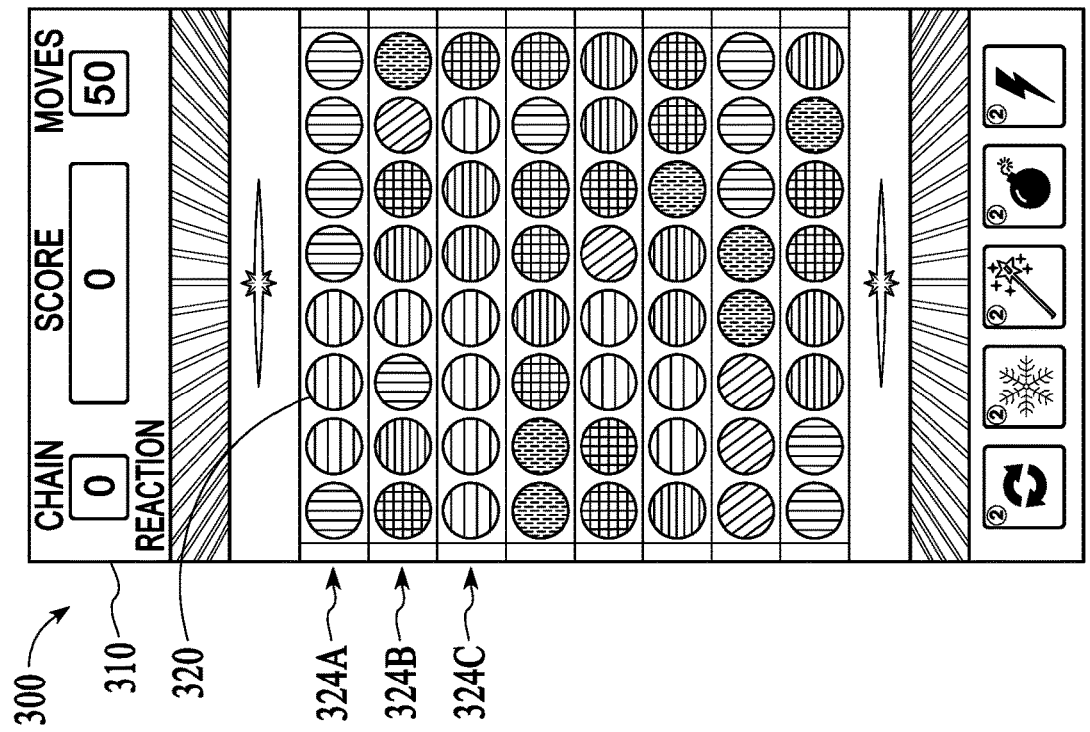
FIGS. 4A and 4B are screenshots to illustrate object movement in an embodiment.
Figure 4A:
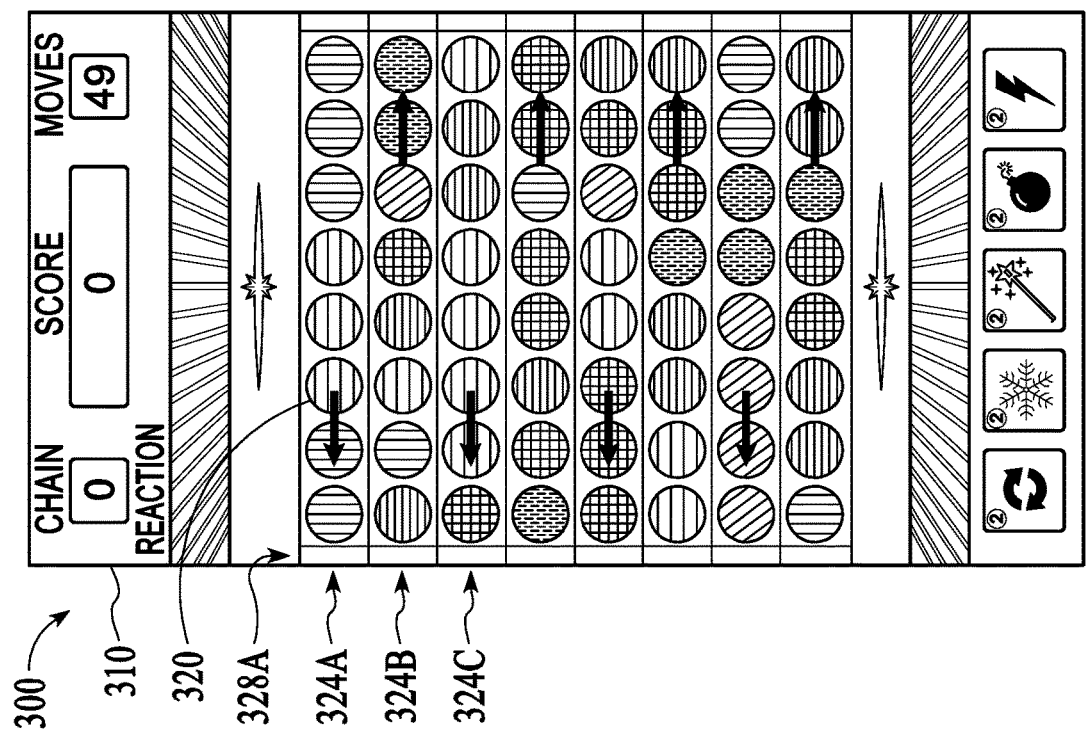

FIGS. 4A and 4B illustrate time-out row shifting. FIG. 4B is the game display 310 after the shifts have occurred from the display in FIG. 4A. In this example, the shifts in all rows happen simultaneously. As shown, top row 324A has been shifted one bead 320 to the right and second row 324B has been shifted one bead 320 to the left. Third row 324C has been shifted one bead 320 to the right . . . and so on. Illustratively, on a game shift, to fill in row 324A, a red bead 320 has entered the top row 324A; an orange bead 320 has entered the second row 324B; and an orange bead 320 has entered the third row 320C.

Figure 5B:
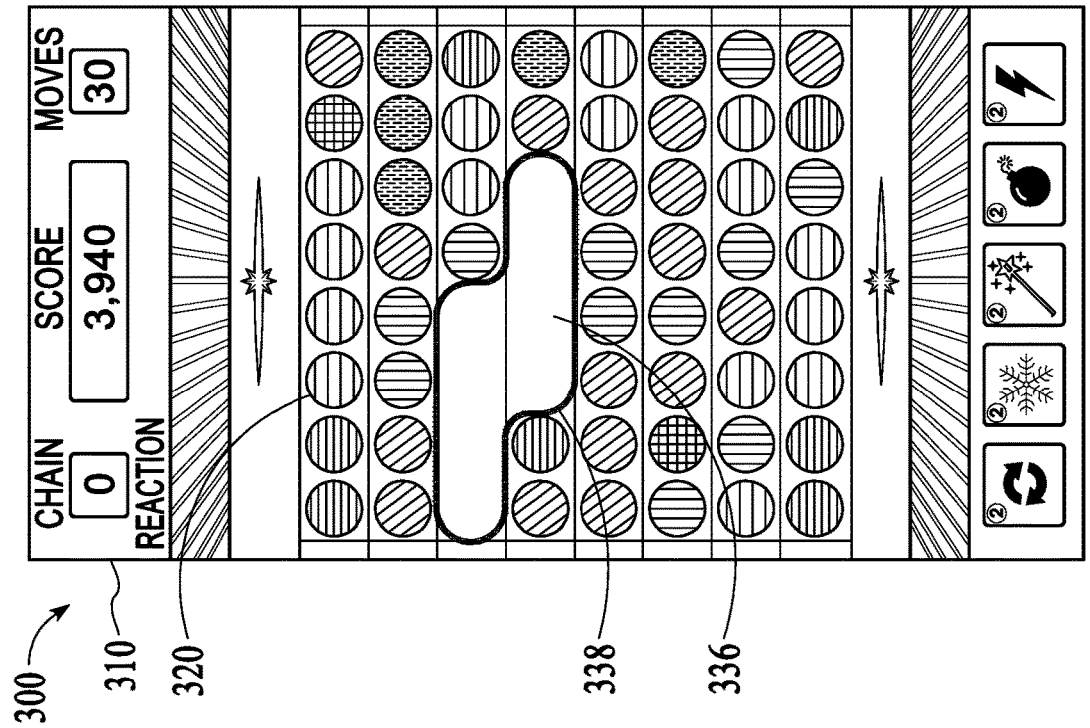
FIGS. 5A-5B are screenshots to illustrate object collisions in an embodiment.
Figure 5A:
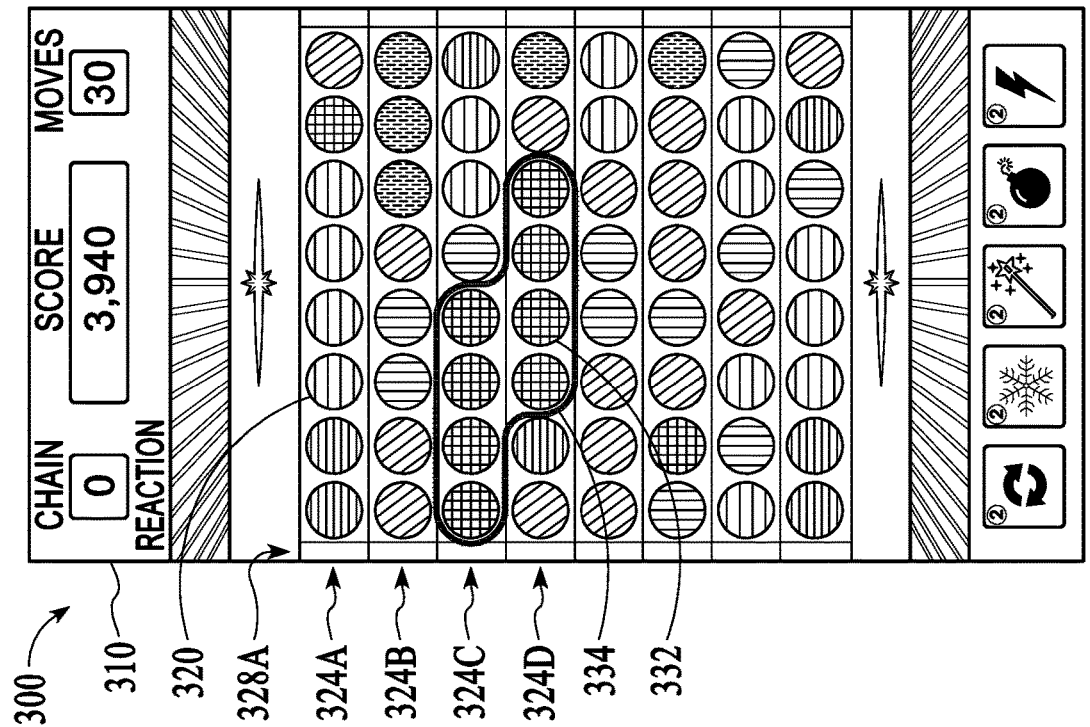

FIGS. 5A-5B are screenshots to illustrate object collisions and removal in an embodiment. In FIGS. 5A-B removing beads 320 from the display 310 causes other beads 320 to move into a vacated space 336. In some implementations, beads 320 that move into a vacated space 336 have the ability to cause a "collision" with remaining beads 320 that have the common property and this, in turn, can cause a "chain reaction" of another removal of beads 320 that causes yet other beads 320 to move into the vacated space 336, etc. as described herein.

For example, as shown in FIG. 5A, to remove a set of beads 320, a set of beads 320 having at least one common property are aligned within rows 324B and row 324C to form a group 332 of adjacent beads 320. An electronic gaming system, such as game system 100 identifies group 332 of beads 320 as being adjacent and having at least one common property, attribute, etc. Illustratively, as illustrated in FIG. 5A, a grey line 334 is used to denote the boundary of the grey-circled group 332 of adjacent beads 320 having the common property. In this example, the common property is color.

To remove grey-circled group of beads 332, a user taps or otherwise selects any beads 320 in the grey-circled group 332, for example, using a touch gesture such as tapping. For example, as shown in 5B, since beads 320 in grey-circled group 332 are all of the same color and are adjacent to each other, tapping on any one of these beads 320 in the grey-circled group 332 causes all of the beads 320 in grey-circled group 332 to be removed, leaving a vacated space 336 illustrated as by grey lines 338. The removal of the beads 320 leaves space or vacancy 336 into which other beads 320 adjacent to the grey-circled group 332 may be moved into. In one implementation, the vacancy is extremely short-lived as other beads 320 adjacent to the grey-circled group 332 are moved into, or flow into, the vacated space 336 almost immediately.

In a particular embodiment, the removal of beads 320 may be accompanied by an effect, such as a visual and/or audio effect, e.g., explosion effect, burning effect, vaporizing effect, and the like, such that the impression is that the beads 320 have been disambiguated (e.g., blown up, destroyed, dissolved, disintegrated, etc.). In other embodiments, any other effect (or no effect at all) can be used to enhance the experience of removing objects 320 from the screen.

Figure 6B:
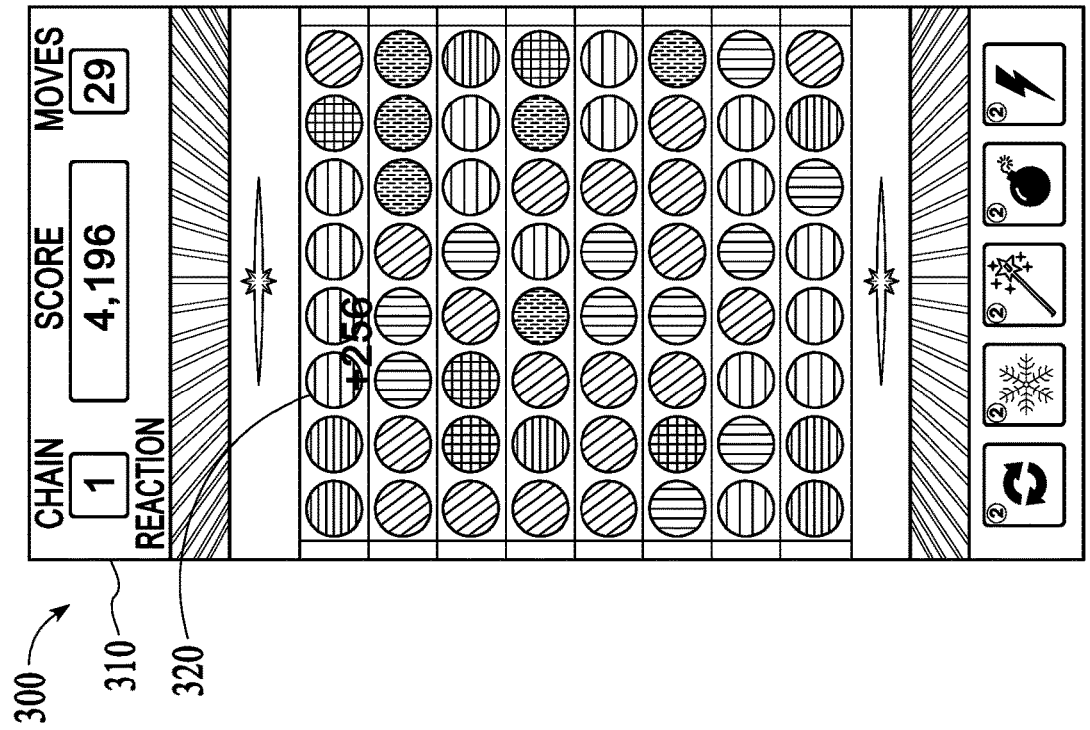
FIGS. 6A-6B are screenshots to illustrate object removal in an embodiment.
Figure 6A:
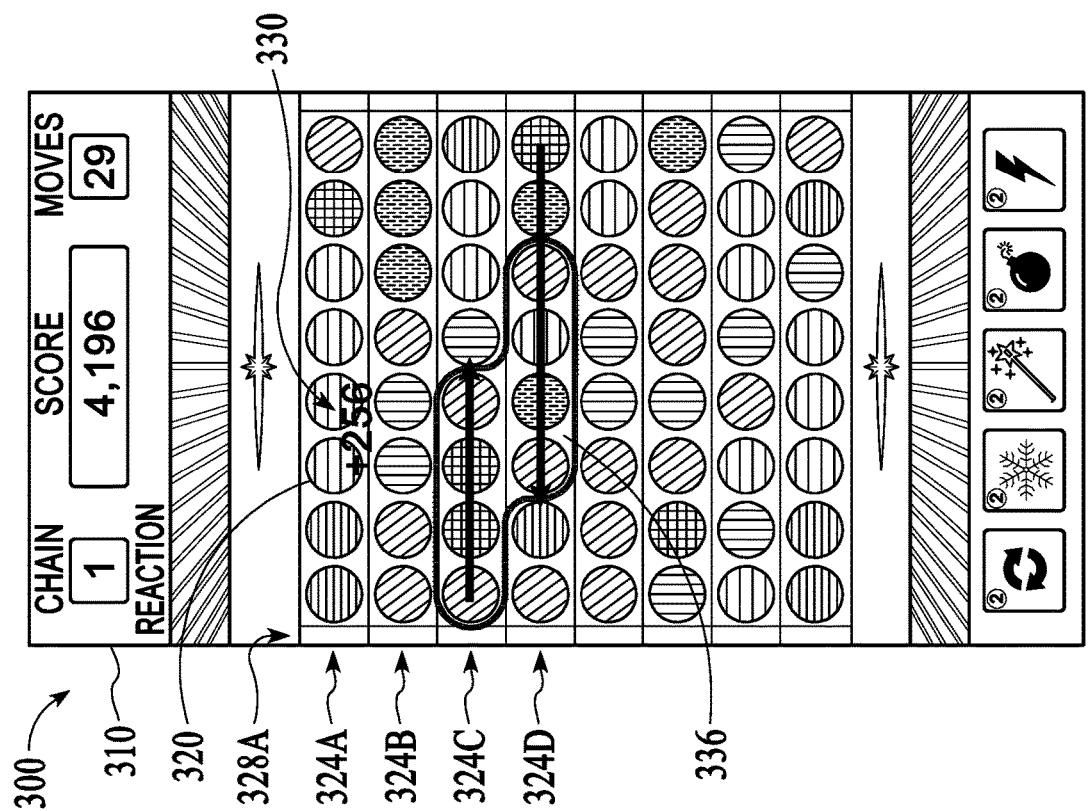

FIGS. 6A-6B are screenshots to illustrate object removal and replacement in an embodiment. For example, FIG. 6A illustrates beads 320 being moved into the vacated space 336 with the final result shown in FIG. 6B. The white arrows show the direction of bead movement, which is in accordance with the movement discussed herein. In this example, row 324C has four beads moved into vacated space 336 from the left. All of these beads 320 have come from off-screen or from beyond the edge of the playing area 310.

In other variations, different methods can be used to cause beads 320 to move into the playing area 310 or to otherwise appear. In lower row 324D, beads 320 are moved in from the right. Note that first two beads 320, were already on the playing area 310 and the next four beads 320 have been moved from beyond the edge of the playing area 310, e.g., passed through entry edges 328.

FIGS. 7A-7B are screenshots to illustrate object movement in an embodiment creating a chain reaction of collisions. In implementations, shown in FIGS. 6A-6B, as beads 320 move into and fill the vacant space 336 they can be said to "hit" or "collide" with beads 320 that remain in the playing area 310. To create a chain reaction a user removes objects 320 in a manner that allows beads 320 with common properties to fill in vacant space 336. If a collision is between two beads 320 of the same attribute, e.g., color, then those two beads 320 may initiate a check by the gaming system to see whether there are other adjacent beads 320 having the common attribute. If there are adjacent beads 320 having at least a common attribute, a new adjacency group may be formed, typically in real-time.

In one implementation, most if not all beads 320 in the new adjacency group formed by the collision will, in turn, be removed in a similar fashion described above for FIGS. 5A-5B and 6A-6B. This removal will cause new beads 320 to be moved which can also result in a collision of same-attribute beads 320 and so on to create a "chain reaction" of removals due to collisions. In an embodiment, these collisions are tracked and may create changes in the scoring as discussed herein.

For example, as illustrated in FIG. 7A, a user may remove a bead (e.g. green bead) 320 in order to create a chain reaction. In this illustration, a group 340 of three adjacent green beads 320 having a common property is presented to a user via game area 310. One green bead 320 in row 234D of group 340 separates a group 342 of blue beads 320 positioned on either side of one green bead 320. In addition, two green beads 320 in row 324E of group 340 separate another group 344 of red beads 320 in row 324E positioned on either side of two green beads 320.

As illustrated in FIG. 7B, when group 340 is removed by a user, for example, by tapping on one or more beads 320 of group 340, a vacant space 336 is formed. Subsequently, beads 320 from group 342 and group 344 move inward to fill in the vacant space 346 and collide to form a new group of beads 320. Since beads 320 of group 342 and similarly group 344, all have the same respective property, e.g., color, and are now adjacent after they move in their respective rows 324D and 324E and collide, bead group 342 (e.g. blue beads) and bead group 344 (e.g., red beads) are removed. In implementations, beads 320 may fill in vacant space 336 (e.g., gap, void, etc.), from any direction, here beads 320 from group 342 and group 344 may move from the left, right, or from both sides of vacant space 336 in order to fill in vacant space 336 and collide.

Figure 8:
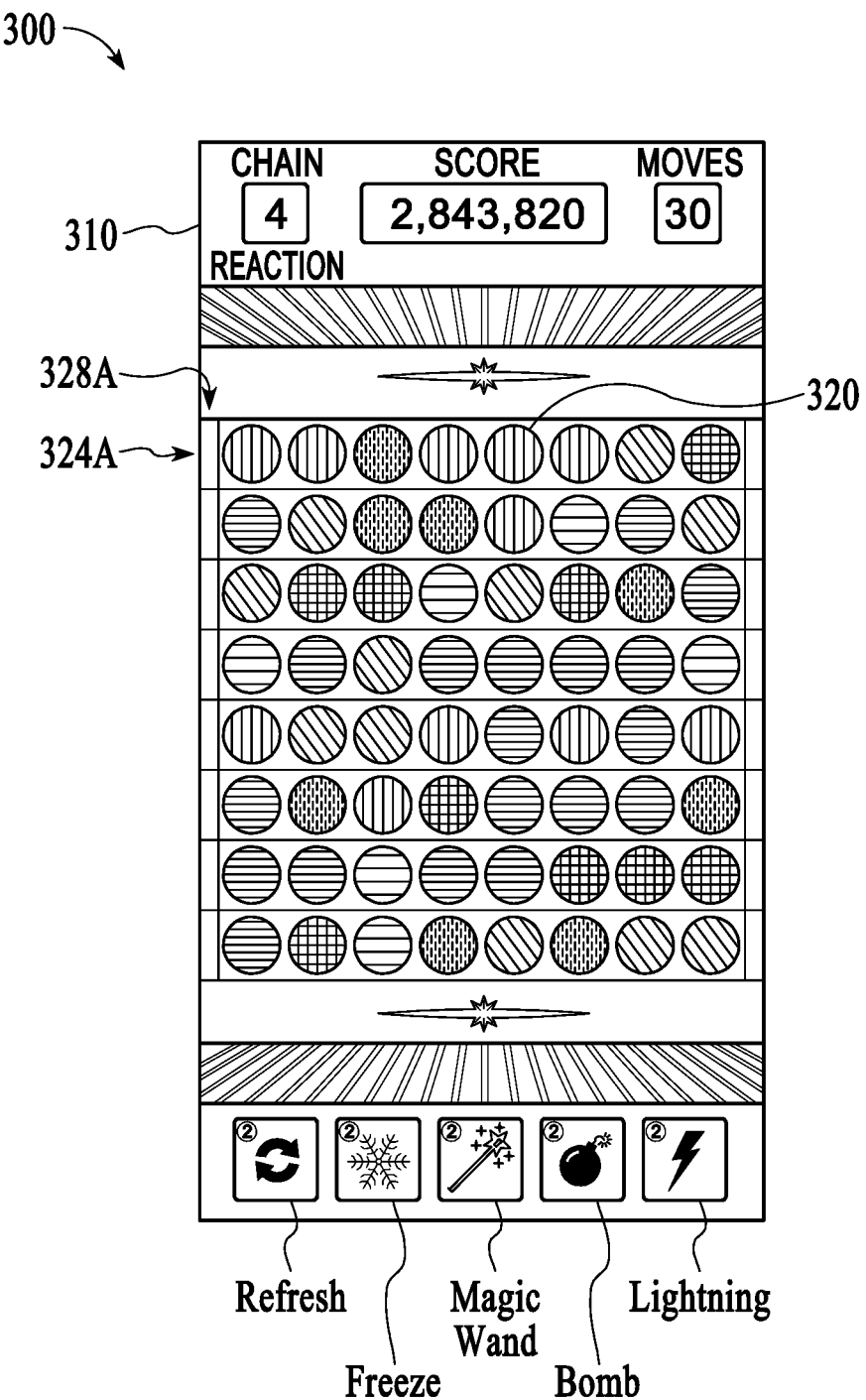
FIG. 8 is a screenshot to illustrate a final state of objects after object movement in an embodiment.

As discussed herein, once all of the groups of two or more objects 320 (e.g., balls, beads, marbles, figures, etc.) having at least one common property are formed by moving objects 320 during the cascade are removed, and no other adjacent objects 320 have the at least one common property are found by the game system, the collision cascade ends. For example, in the case being discussed of FIGS. 7A-7B, at the end of the collision process occurs when there is no secondary collision effect. For example, when the two beads 320 that collide with remaining beads 320 do not collide with other beads 320 having the same property or attribute, the chain reaction ends. The final result of the movement of objects 320 after the collision process has ended is shown in FIG. 8.

Figure 9B:
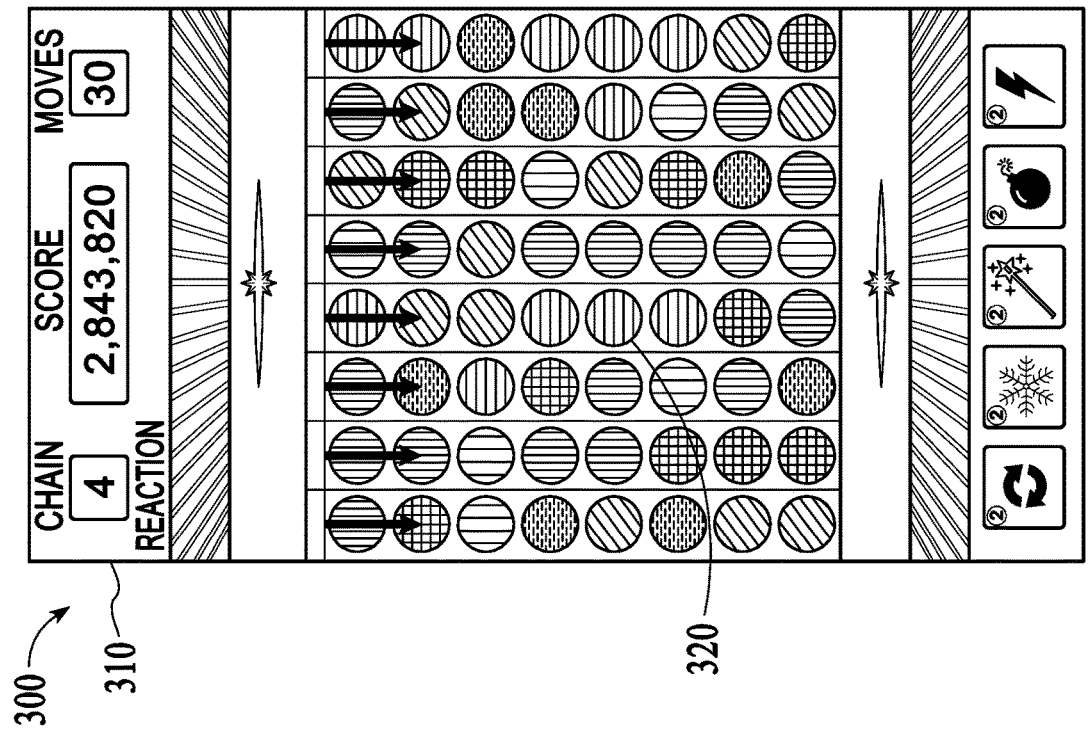
FIGS. 9A-9B are screenshots to illustrate creating a chain reaction in an embodiment.
Figure 9A:
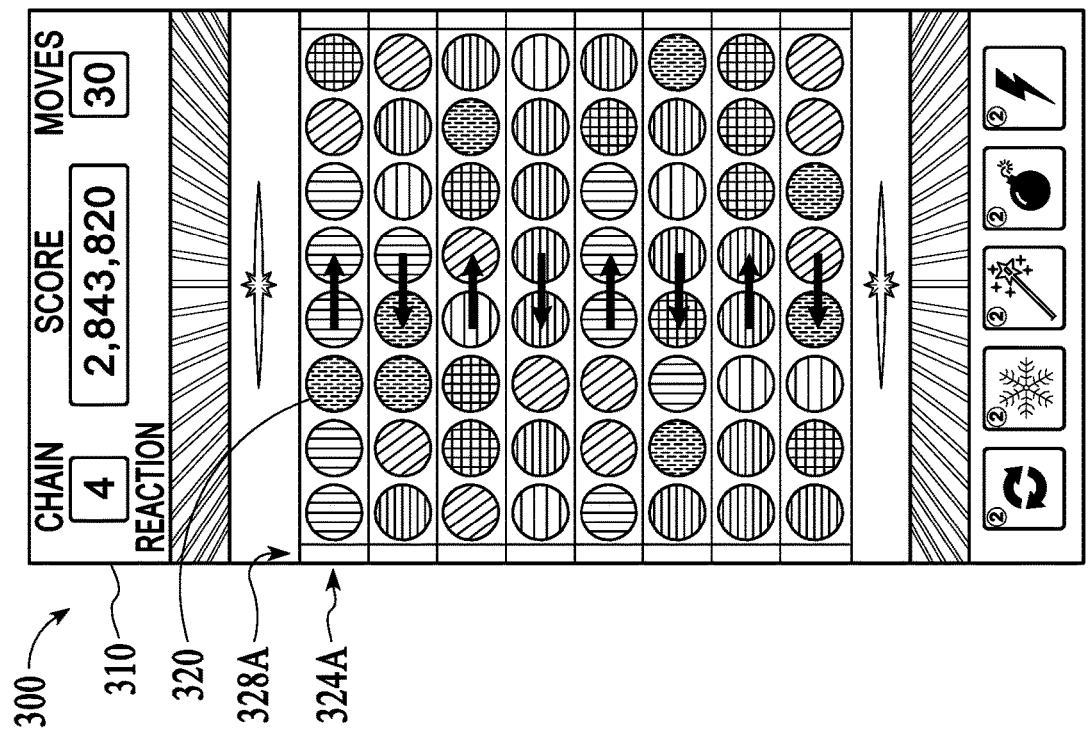

FIGS. 9A-9B are screenshots to illustrate bead position and movement after one or more chain reactions. After the final result of the chain reaction as shown in FIG. 8, as illustrated in FIG. 9A, beads 320 in rows 324A-H continue to move horizontally either from left to right, or right to left, with respect to each row 324 until the end of the game is reached. In other implementations, as shown in FIG. 9B, beads 320 may move vertically. In some implementations, beads 320 may move in a combination of directions, such as horizontal, vertical, angular, or randomly or pseudo randomly, etc.

Figures 10A, 10B:
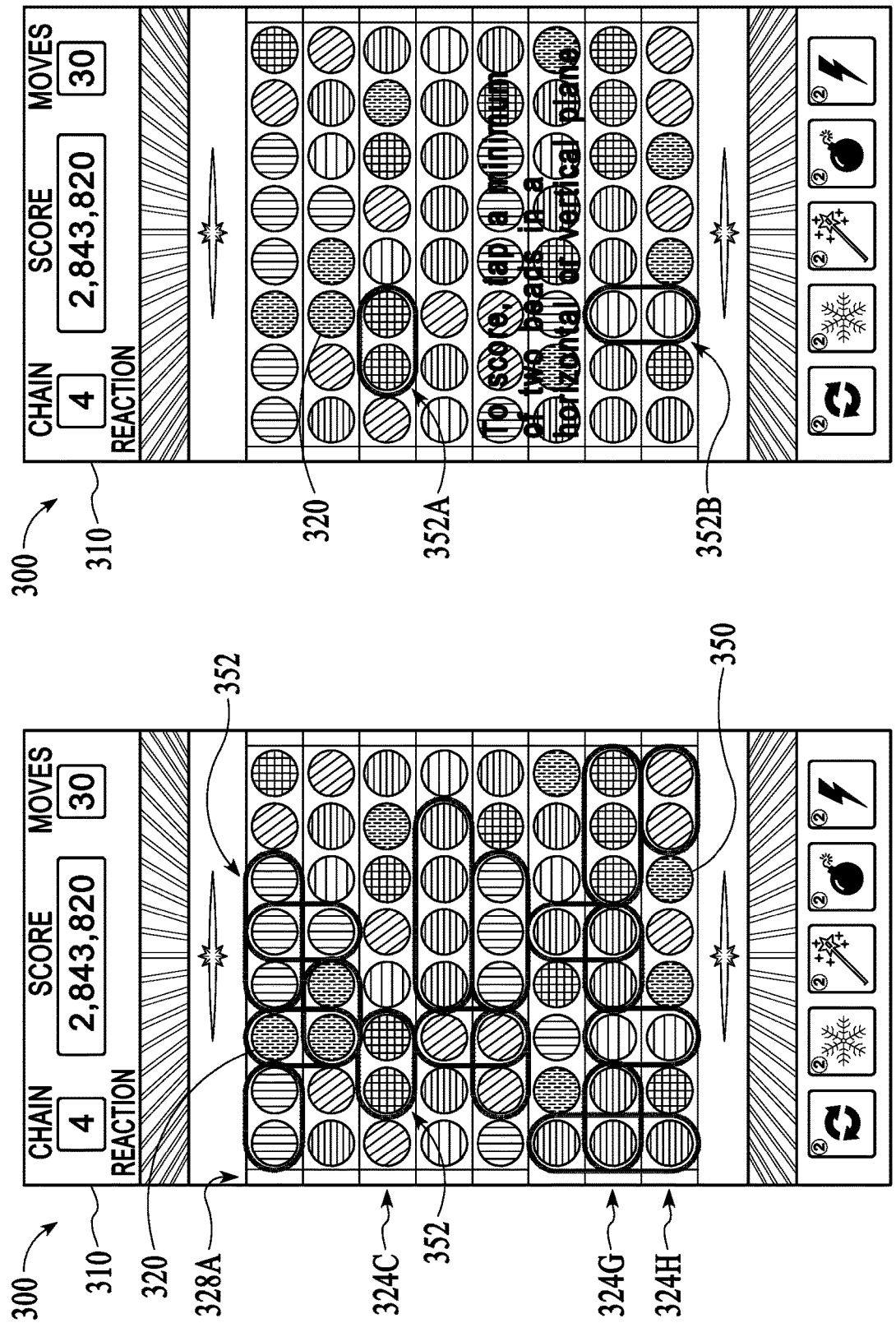
FIGS. 10A-10B are screenshots to illustrate game scoring to incur points in an embodiment.

FIGS. 10A-10B are screenshots to illustrate scoring. In one implementation, scoring may be achieved by removing at least two objects 320 from the play area 310. For example, as illustrated in FIG. 10A, in one configuration beads 320 are arranged in a pattern 350 at one time period before changing to a new pattern at the next time period, as described herein. In this particular arrangement, there are a number of bead groupings 352, where two or more beads 320, having a common property, such as color, are adjacent one another.

As illustrated in FIG. 10B, at this moment in the gameplay, a user may select, (e.g., tap) on any beads 320 within one of the bead groupings 352 to remove the bead grouping 352 from the play area 310 and score points. As illustrated, tapping on beads within bead grouping 352A will remove two beads 320 from row 324C. If the user selects any beads 320 from bead grouping 352B, one bead from each row 324G and 324H will be removed. Once the selected bead grouping 352 is removed, e.g., 352A, other beads 320 around the removed grouping move to fill in the gap left by the removal of grouping 352 as discussed above.

For example, given a user removes bead grouping 352A, beads 320 from row 324C would move horizontally to fill in the gap left by the removed bead grouping 352A. Beads 352 may move from right to left, left to right, or from both sides to fill in the gap. In one implementation, a physical fluid dynamics model may be used to determine how the beads 320 in row 324C will flow. For example, if beads 320 in row 324C are under a simulated fluid pressure, beads 320 may be moved using a fluid simulation configured to simulate fluid motion with respect to that pressure to fill in the gap, similar to water flowing into an open drain.

Figure 11:
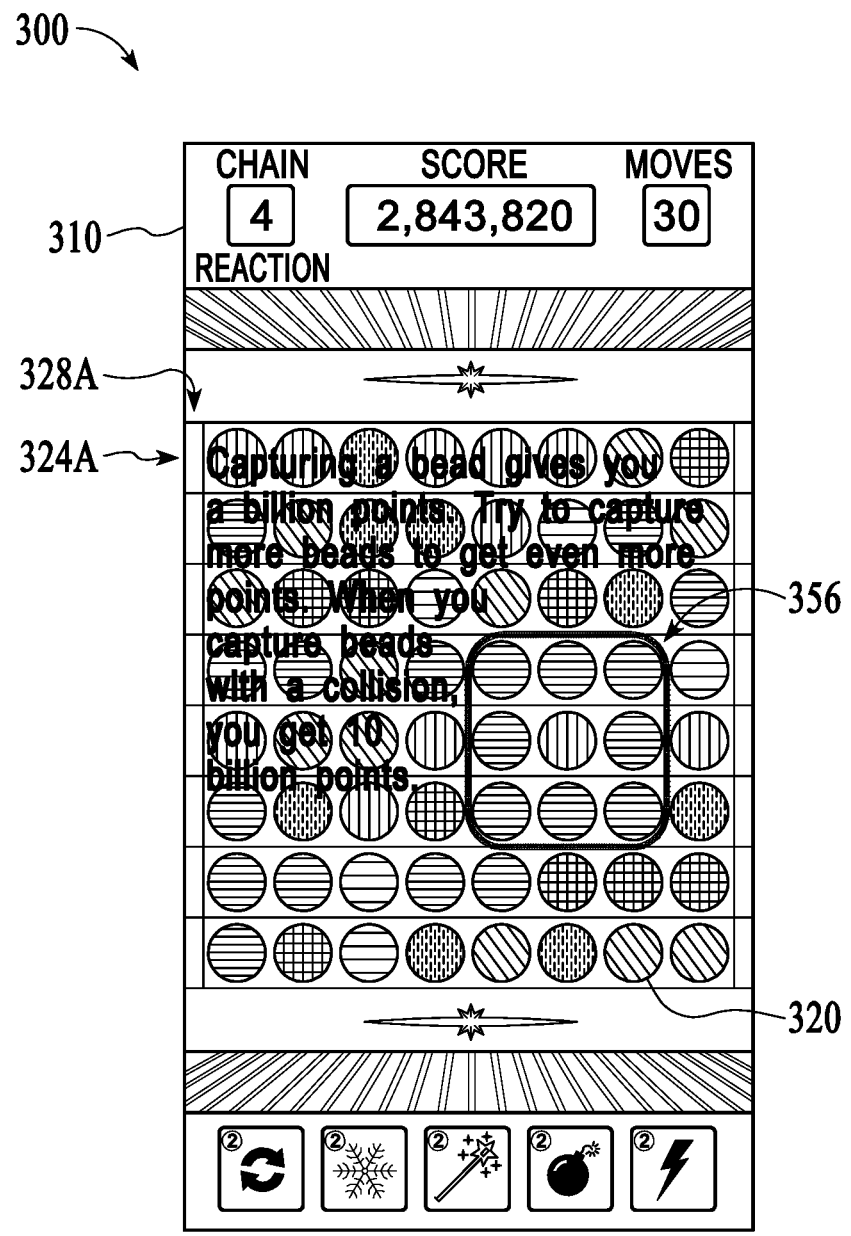
FIG. 11 is a screenshot to illustrate capturing an object to incur points in an embodiment.

FIG. 11 is a screenshot to illustrate capturing an object 320 to incur points. In an implementation, scoring may be enhanced relative to a particular configuration of beads 320. As illustrated in FIG. 11, a user may remove beads 320 to form a capturing formation of beads 356. Since capturing a bead 302 using other beads 320 may take an additional user skill and strategy, such capturing formation of beads 356 may incur an additional game perk such as additional bonus number of points scored, additional play time, variations in game time, additional power ups, less types of beads in the play area 310, etc. Other variations are possible. For example, removing groups of beads 320 to allow a particular bead 320 to move from one side of the game area 310 to another side without being removed may incur additional points, tokens, play bonus, life, etc.

Figure 12:
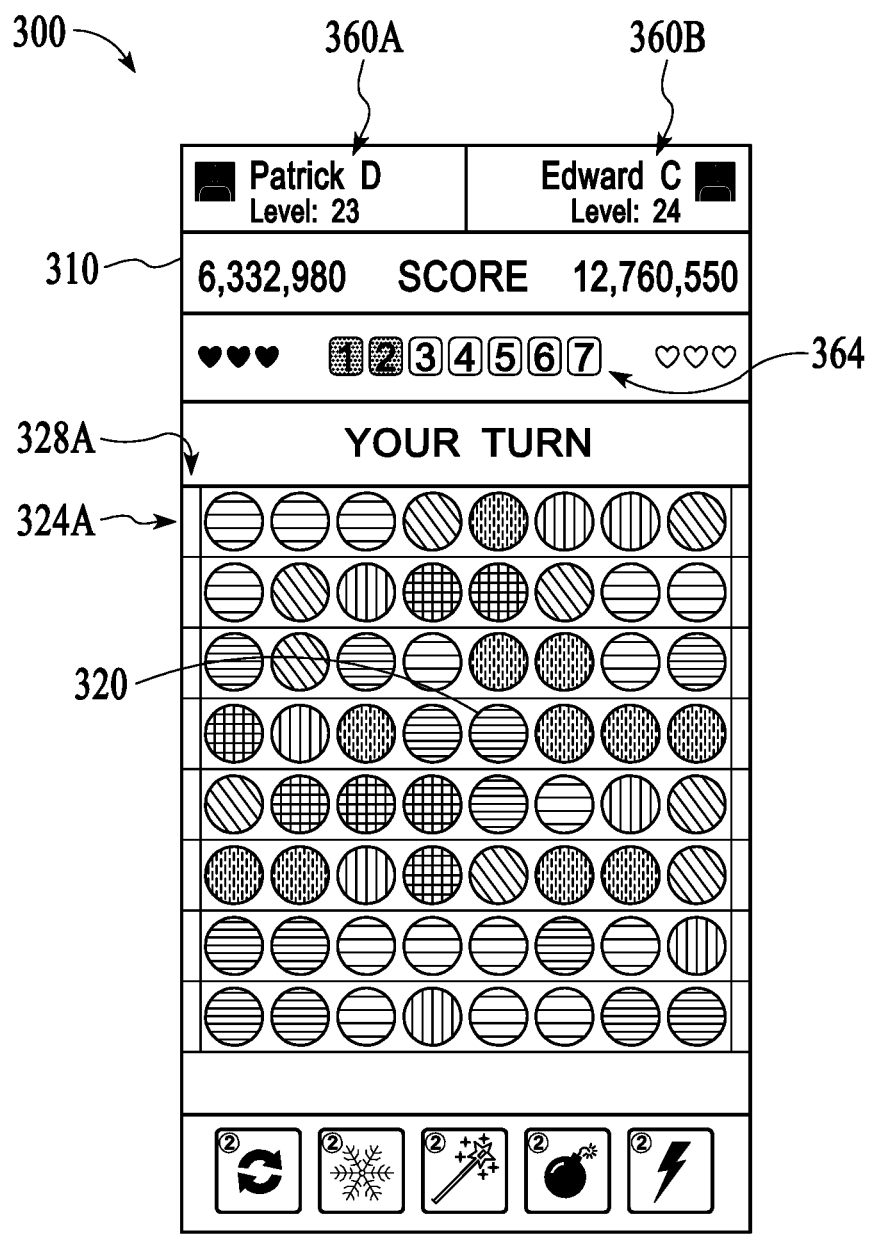
FIG. 12 is a screenshot to illustrate two-player gameplay in an embodiment.

FIG. 12 is a screenshot to illustrate two-player gameplay. In an implementation, two players may share a common play are 310 and take turns playing a game. For example, as illustrated, player 360A (e.g., Patrick D) may be playing another player 360B (e.g., Edward C). In this scenario, game mechanics may be similar to those described herein but player 360A and player 360B take turns. In one gameplay scenario, each player 360 makes a fixed number of moves, e.g., 3 moves, at each inning. Who ever scores the highest at the end of a number of innings, e.g., 7 innings, wins the game. Here, inning counter 364 shows it is 2nd inning and player 360A's turn where with "6,332,980" points player 360A is trailing player 360B who has 12,760,550 points.

In other game scenarios, to enhance gameplay excitement game mechanics may vary relative to the skill of the player 360. For example, gameplay for player 360A may be different for player 360A than player 360B. Here, since player 360 has achieved a level of "twenty-three" and player 360B has achieved a level of "twenty four," player 360A may be giving a handicap such as an easier game mechanic, extra scoring, etc. in order to increase the competitive challenge to player 360B.

Figure 13:
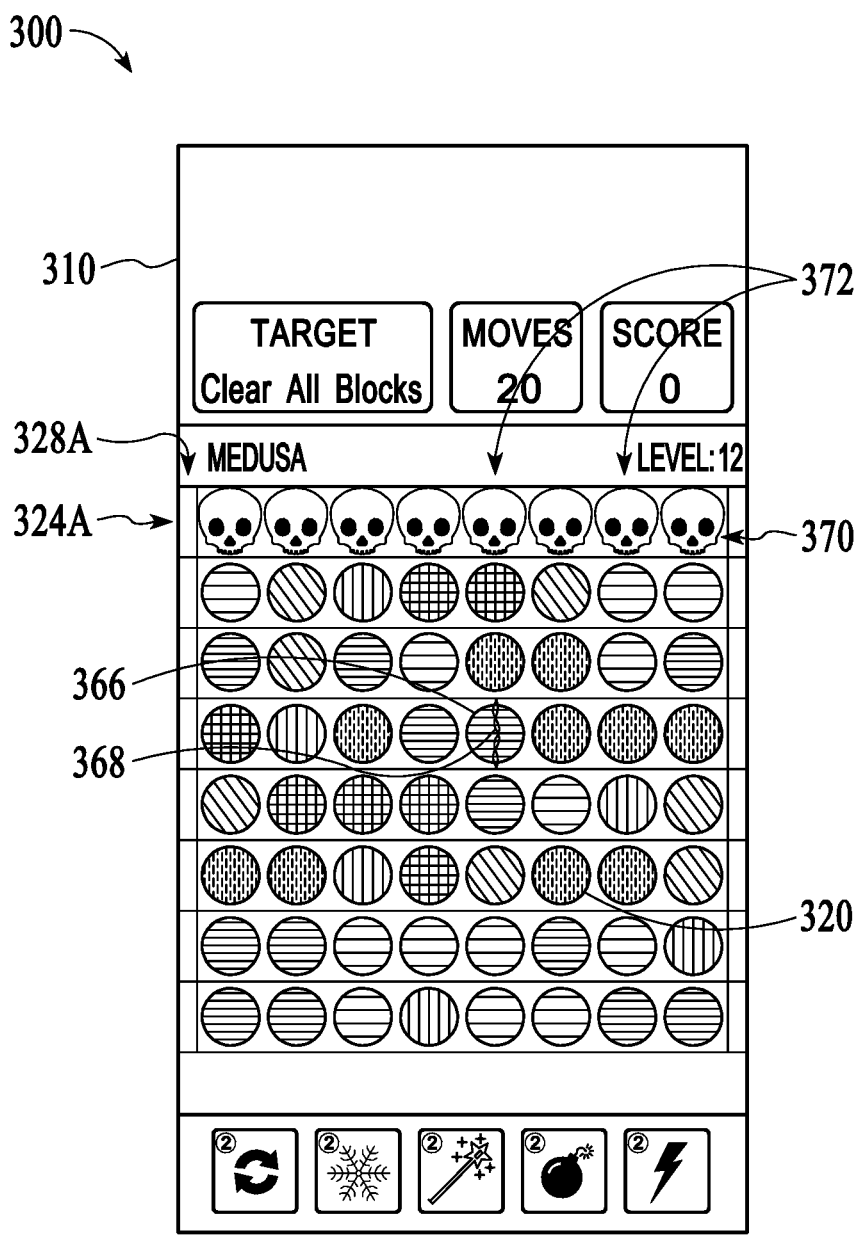
FIG. 13 is a screenshot to illustrate gameplay involving a fixed number of moves in an embodiment.

FIG. 13 is a screenshot to illustrate gameplay involving a fixed number of moves. In implementations, gameplay mechanics are varied such that a user must complete the game within a set time, set number of moves, or a combination of both. Here, to provide more user interaction with the game, a bead 320 may be configured as a special bead 366. For example, a special bead 366 may be a "sparkling bead" configured with a "spark" 368 to randomly alternate in various directional planes, e.g., vertical and horizontal plane, and when activated may clear a whole row or column in the direction of spark 368. These special beads 366 also can be used in conjunction with power ups 308 down as described herein.

Here, the game mechanic requires a user remove all skulls 370 within a fixed number of time periods (e.g., sequential reconfigurations of play area 310) by removing associated columns 372 using a combination of removing beads 320 and using special bead 366 when activated. For example, in this scenario as a user removes beads 320 under skulls 370, when a user removes all of the beads in a column 372, the associated skull 370 may fall down associated column 372.

Figure 14:
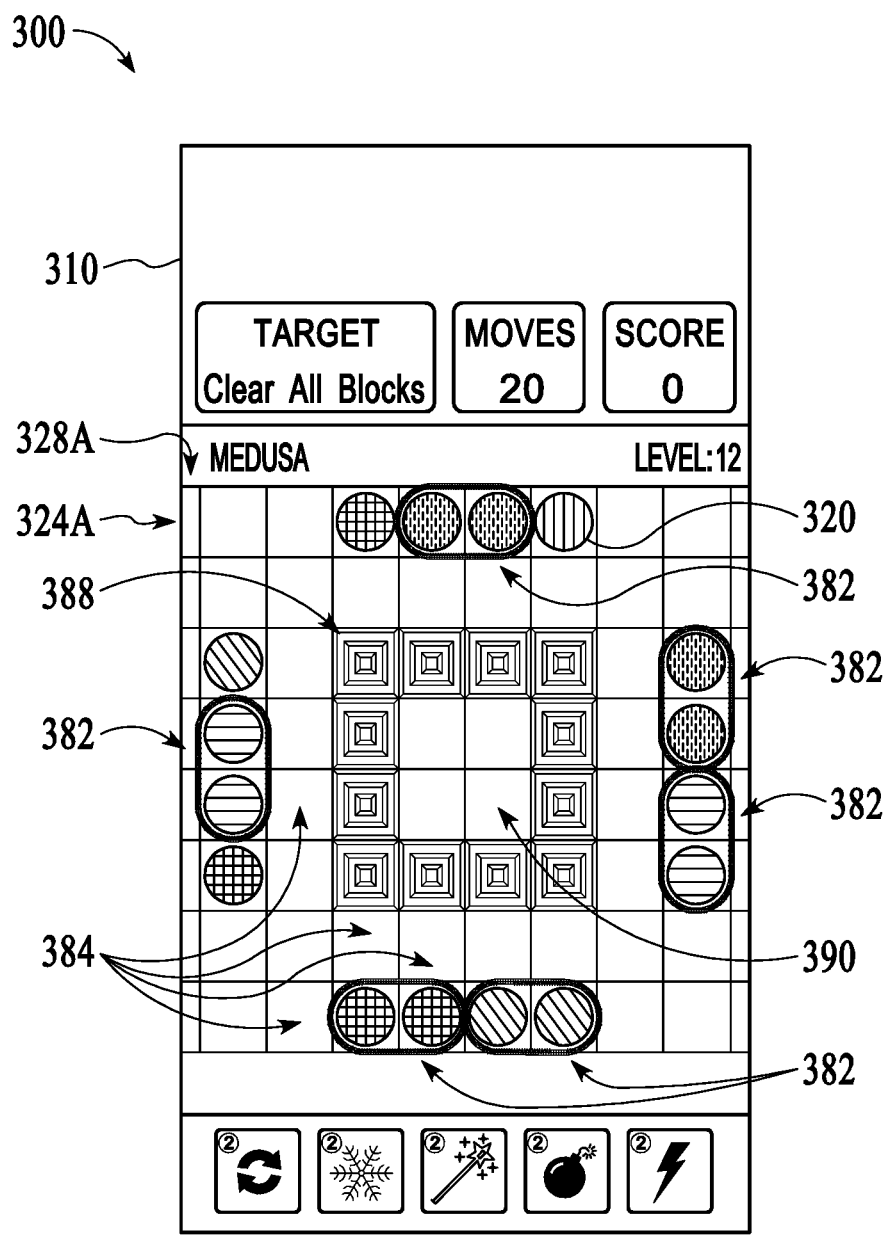
FIG. 14 is a screenshot to illustrate gameplay involving uncovering design patterns in an embodiment.

FIG. 14 is a screenshot to illustrate gameplay involving uncovering design patterns and/or opening more space for objects 320 to occupy. In one game implementation, as user removes beads 320, adjacent blocks 384 are removed exposing more play area 310 to the user and allowing more beads 320 to enter the play area 310. For example, as illustrated in FIG. 14, a group 382 of adjacent beads 320 may be removed which then removes adjacent blocks 384. As adjacent blocks 384 are removed, more gaps may be created where blocks 384 were, which allows beads 320 entering play area 310, from for example, entry edges 328, to fill in the gaps. A user may then use cascading removal of beads 320 as described herein to remove more blocks 384 at each play.

In some configurations, non-removable objects 388, may be used to create more challenges be placing obstructions in the way of beads 320. In this particular example, removing blocks 384 adjacent non-removable objects 388 may allow the non-removable objects 388 to act as entry points for beads to enter a protected area, such as protected areas 390, as shown.

FIG. 15 is a screenshot to illustrate game badges, trophies, and achievement awards. In some implementations, various badges 392, trophies 394, and awards 396 may be earned by a user. Such badges 392, trophies 394, and awards 396, may be designed to emulate a change in player status. For example, larger trophies 394 and larger awards 396 may be designed to show an increase in player status, player winning, player longevity, and the like.

Although the description has been described with respect to particular embodiments thereof, these particular embodiments are merely illustrative, and not restrictive. For example, although the common characteristic for bead adjacency grouping and collision chain reactions has been described as being the color of the beads 320, any other characteristic may be used. In other games beads 320 may have different patterns or designs, animations or other effects. Objects can be any desired shape besides beads and the shapes may change. Many other variations are possible.

Figure 16:
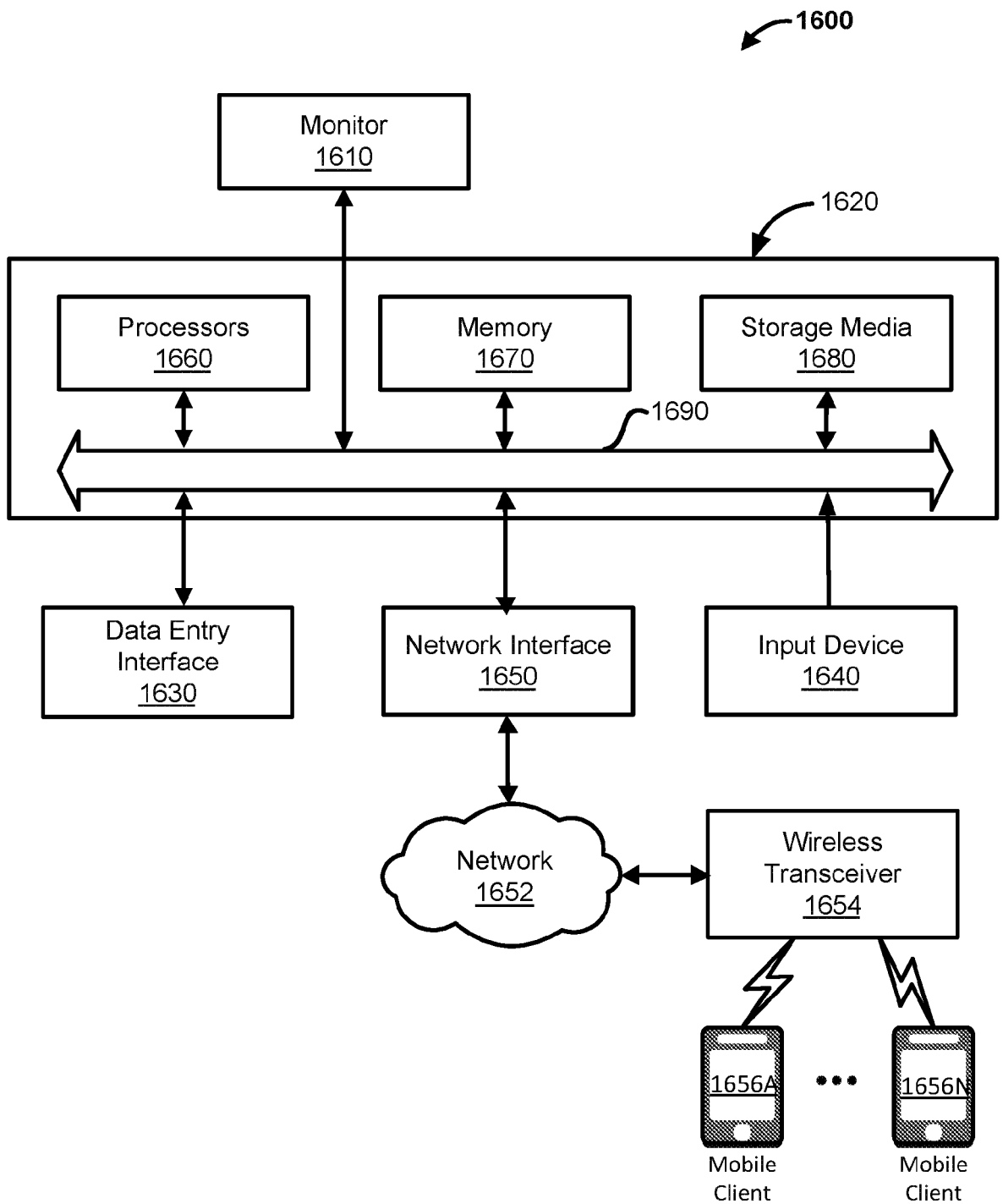
FIG. 16 is a high-level block diagram of an exemplary computer and communication system.

FIG. 16 is a block diagram of an exemplary computer system 1600 for use with implementations described in FIGS. 1-15. Computer system 1600 is merely illustrative and not intended to limit the scope of the claims. One of ordinary skill in the art would recognize other variations, modifications, and alternatives. For example, computer system 1600 may be implemented in a distributed client-server configuration having one or more client devices in communication with one or more server systems.

In one exemplary implementation, computer system 1600 includes a display device such as a monitor 1610, computer 1620, a data entry device 1630 such as a keyboard, touch device, and the like, a user input device 1640, a network communication interface 1650, and the like. User input device 1640 is typically embodied as a computer mouse, a trackball, a track pad, wireless remote, tablet, touch screen, and the like. Moreover, user input device 1640 typically allows a user to select and operate objects, icons, text, characters, and the like that appear, for example, on the monitor 1610.

Network interface 1650 typically includes an Ethernet card, a modem (telephone, satellite, cable, ISDN), (asynchronous) digital subscriber line (DSL) unit, and the like. Further, network interface 1650 may be physically integrated on the motherboard of computer 1620, may be a software program, such as soft DSL, or the like.

Computer system 1600 may also include software that enables communications over communication network 1652 such as the HTTP, TCP/IP, RTP/RTSP, protocols, wireless application protocol (WAP), IEEE 802.11 protocols, and the like. In addition to and/or alternatively, other communications software and transfer protocols may also be used, for example IPX, UDP or the like.

Communication network 1652 may include a local area network, a wide area network, a wireless network, an Intranet, the Internet, a private network, a public network, a switched network, or any other suitable communication network, such as for example Cloud networks. Communication network 1652 may include many interconnected computer systems and any suitable communication links such as hardwire links, optical links, satellite or other wireless communications links such as BLUETOOTH, WIFI, wave propagation links, or any other suitable mechanisms for communication of information. For example, communication network 1652 may communicate to one or more mobile wireless devices 1656A-N, such as mobile phones, tablets, and the like, via a base station such as wireless transceiver 1654.

Computer 1620 typically includes familiar computer components such as one or more processors 1660, and memory storage devices, such as memory 1670, e.g., random access memory (RAM), storage media 1680, and system bus 1690 interconnecting the above components. In one embodiment, computer 1620 is a PC compatible computer having multiple microprocessors, graphics processing units (GPU), and the like. While a computer is shown, it will be readily apparent to one of ordinary skill in the art that many other hardware and software configurations are suitable for use with the present invention.

Memory 1670 and Storage media 1680 are examples of non-transitory tangible media for storage of data, audio/video files, computer programs, and the like. Other types of tangible media include disk drives, solid-state drives, floppy disks, optical storage media such as CD-ROMS and bar codes, semiconductor memories such as flash drives, flash memories, read-only-memories (ROMS), battery-backed volatile memories, networked storage devices, Cloud storage, and the like.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A method for controlling a computer game, the method comprising:
    displaying a plurality of objects on a gameplay area at a first game interval generating a first game display configuration;
    accepting a user input to cause selecting of one or more of the plurality of objects;
    in response to the selecting, performing the following:
    removing the selected objects from the gameplay area; and
    moving other objects into a space formerly occupied by the removed objects by employing a fluid dynamics model to simulate a fluid motion of the other objects.

2. The method of claim 1, wherein the other objects are moved into the space from alternating directions including left-to-right and right-to-left.

3. The method of claim 1, wherein the other objects are moved into the space from alternating directions including top-to-bottom and bottom-to-top.

4. The method of claim 1, wherein an object is moved into the space formerly occupied by the removed objects from a position off of the display.

5. The method of claim 1, wherein objects are slid along a predetermined direction in order to fill the space formerly occupied by the removed objects.

6. The method of claim 5, wherein when an object is slid into the space it becomes adjacent to one or more stationary objects.

7. The method of claim 1, wherein the removing further comprises:
removing moved objects and stationary objects having a common characteristic that are adjacent to one another.

8. The method of claim 7, wherein the common characteristic includes color.

9. The method of claim 7, wherein the common characteristic includes shape.

10. The method of claim 7, wherein the common characteristic includes animation.

11. The method of claim 7, wherein the common characteristic includes a value.

12. The method of claim 11, wherein the value is indicated by a number.

13. The method of claim 11, wherein the value is indicated by one or more symbols.

14. The method of claim 1, further comprising:
automatically repeating the removing if the moving of one or more of the other objects causes a condition to be met.

15. The method of claim 14, further comprising:
employing a physics model to simulate collisions between objects moving into the at least a portion of the space.

16. A computer implemented method for a user interface for a video game played on a computing device, the method comprising:
displaying a plurality of objects on a gameplay area at a first game interval generating a first game display configuration;
accepting a user input to cause selecting of one or more of the plurality of objects;
in response to the selecting, performing the following:
removing adjacent objects that match at least one characteristic of the selected objects from the gameplay area; and
moving other objects in a fluid simulation to simulate the other objects moving as flowing into a space formerly occupied by the removed objects, wherein the objects are moved into the space from at least two alternating directions.

17. The computer implemented method of claim 16, wherein the at least two alternate directions include left-to-right and right-to-left.

18. The computer implemented method of claim 16, wherein the at least two alternating directions include top-to-bottom and bottom-to-top.

* * * * *